United States Patent Office 3,010,610
Patented Nov. 28, 1961

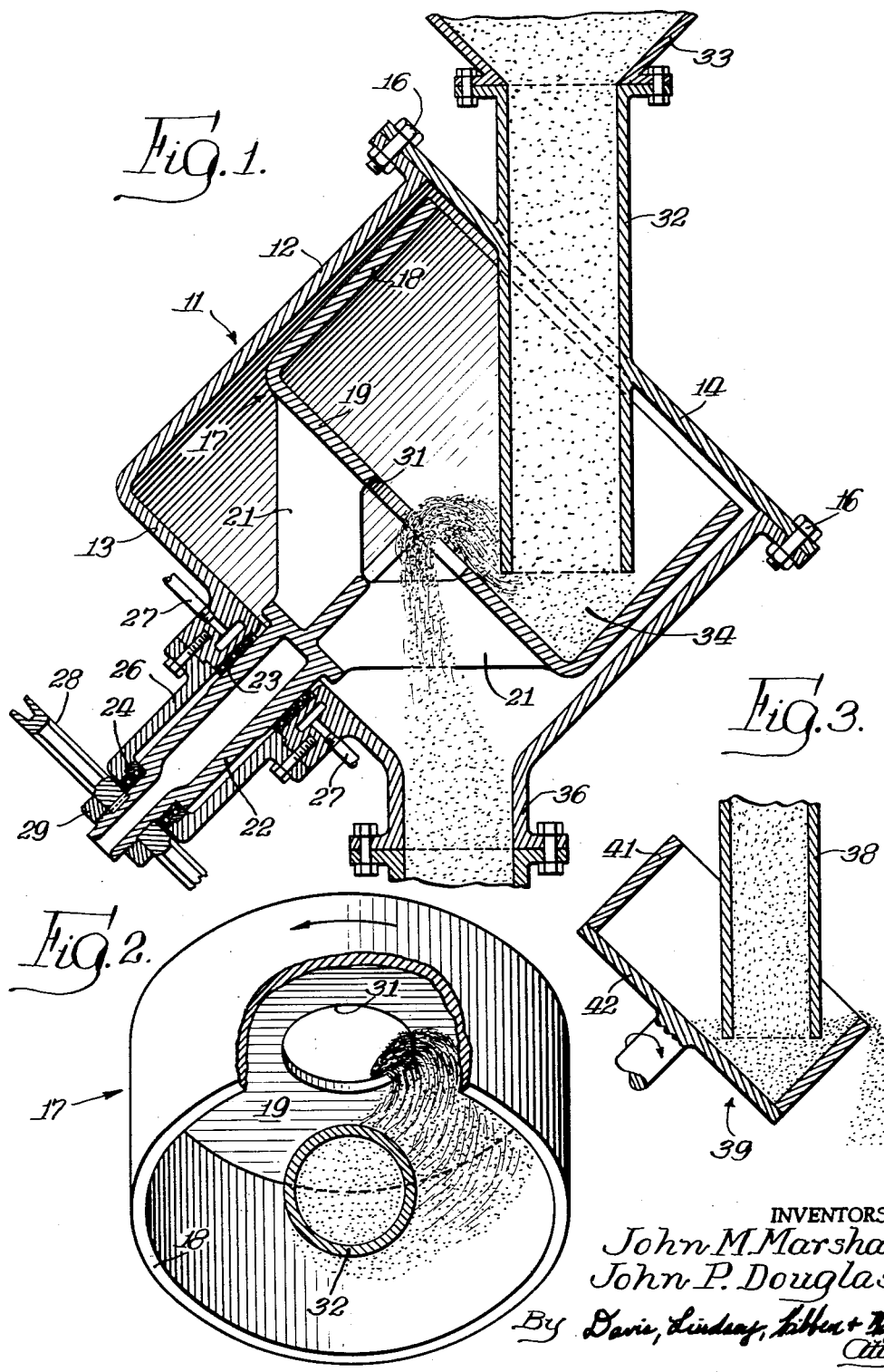

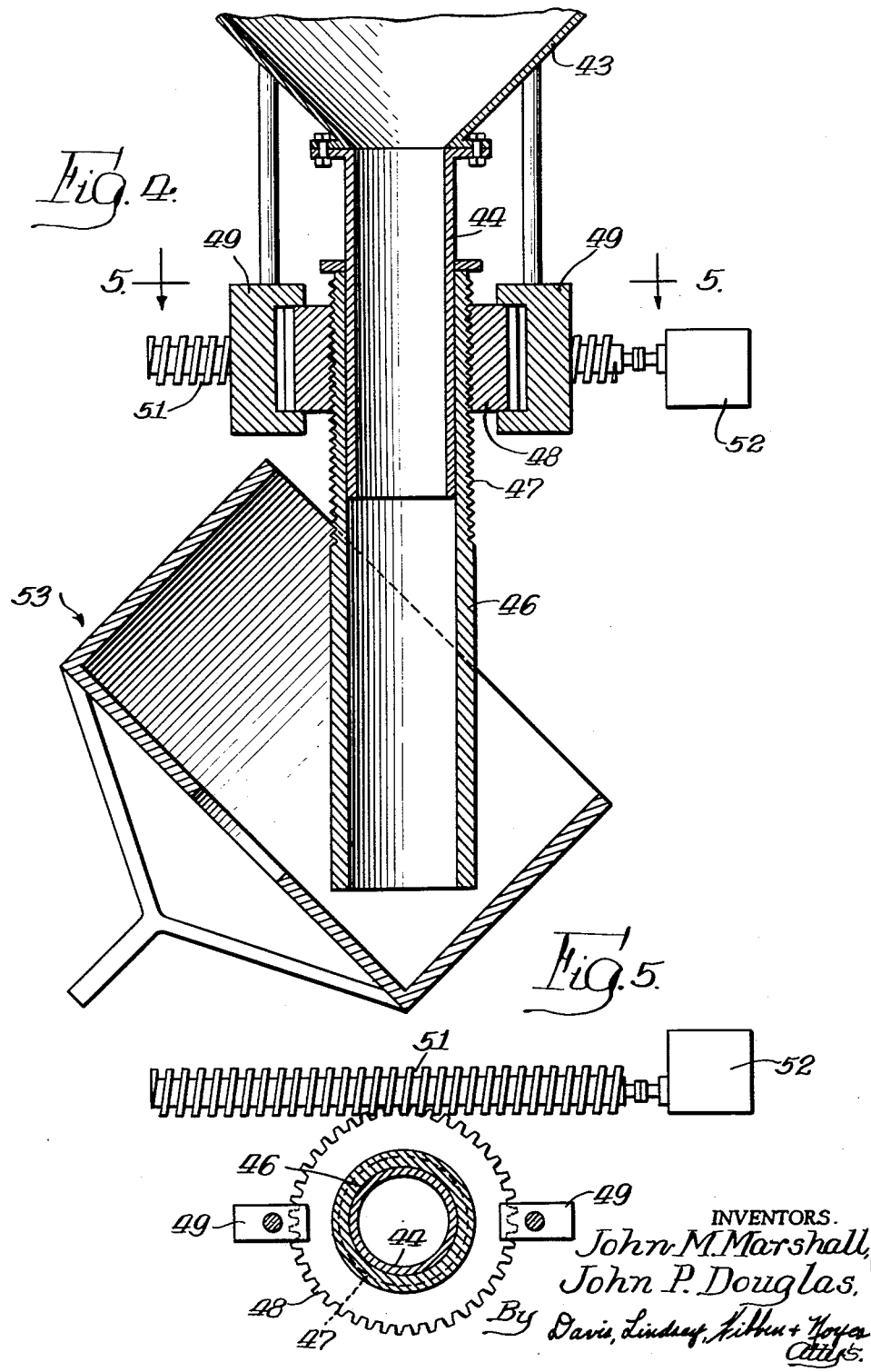

3,010,610
SOLIDS FLOW CONTROL DEVICE
AND METHOD
John M. Marshall, Chicago, and John P. Douglas, Calumet City, Ill., assignors to Inland Steel Company, Chicago, Ill., a corporation of Delaware
Filed Jan. 6, 1958, Ser. No. 707,216
16 Claims. (Cl. 222—1)

This invention relates to a device and method for controlling the flow of subdivided or granular solids.

There are many instances in which it is necessary to provide suitable control or regulation of the flow of solid materials. For example, such materials as grain, seeds, sand, crushed rock or gravel, coal, fertilizers, and other discrete solid particles must frequently be measured or fed in controlled quantities. In addition, various solid chemical reactants must often be fed or discharged under accurately controlled conditions during a manufacturing operation. Still other examples of systems requiring close control of solid flow rate are the various catalytic processes employing a moving bed of subdivided solid catalyst particles. Similarly, there are numerous chemical reactions and solid-gas contacting operations which are carried out utilizing a moving bed of solids and a stream of gaseous material wherein it is necessary to have suitable control over the flow of the solids phase. For example, in the reduction of iron oxide ore by countercurrent contacting of upwardly flowing reducing gases with downwardly moving granular iron ore particles, it is important to provide effective means for controllably feeding the iron ore particles to the reduction zone and also for controllably discharging the reduced iron ore particles from the reduction zone.

Various prior art devices are known for controlling the gravity flow of solids, e.g. slide valves, star feeders, screw feeders, rotary table feeders, etc. However, all of the devices heretofore known have certain limitations and disadvantages which restrict their usefulness. Some of these disadvantages include high power or torque requirements, high initial and maintenance costs, severe wear of the equipment when handling abrasive particles, undesirable attrition or grinding action on the solid particles being handled, and inability to handle varying types and sizes of solid particles.

Accordingly, a primary object of the invention is to provide a novel device for feeding, discharging, or otherwise controlling the flow of subdivided solids.

A related object of the invention is to provide a novel method for controlling the flow of subdivided solids.

Another object of the invention is to provide a novel rotary device for controllably feeding and discharging solid particles which is characterized by its inexpensiveness, by its durability and wear resistance, and by its slight attrition or grinding action on the solid particles being handled.

A further object of the invention is to provide a novel rotary device for controllably feeding and discharging solid particles which is characterized by its unique ability to handle many types of solid particles in a wide range of particle sizes while at the same time providing exceptional accuracy of control at both high and low flow rates.

Other objects and advantages of the invention will become apparent from the subsequent detailed description taken in conjunction with the accompanying drawings, wherein:

FIG. 1 is a longitudinal sectional view of a preferred embodiment of the invention:

FIG. 2 is a top plan view of an internal part of the device shown in FIG. 1 with a portion thereof broken away to reveal the movement of the solid particles;

FIG. 3 is a fragmentary sectional view illustrating another embodiment of the invention;

FIG. 4 is a longitudinal sectional view illustrating a further modification of the invention; and FIG. 5 is a horizontal sectional view taken substantially along the line 5—5 of FIG. 4.

Broadly speaking, our invention involves a rotatable container, preferably cylindrical, which is mounted for rotation about an inclined axis and has angularly related wall portions defining therebetween a continuous annular pocket or trough having a generally V-shaped cross-section radially of the container. A conduit or feed pipe is provided for gravity feeding of a confined stream of solid particles downwardly into the enlarged angular space or trough at the lower part of the rotary container or cylinder. At least one end of the rotary container has an opening, and the feed pipe outlet is disposed at least as low as the level of the lowermost part of said opening and is spaced from the walls of the container. Upon rotation of the container about its inclined axis, solid particles are carried bodily away from the point of discharge of the confined stream into the annular pocket and are thus moved in an upwardly inclined rotary path until the particles overflow through the container opening at a rate which is directly responsive to the rate of rotation of the container.

Referring first to FIGS. 1 and 2 of the drawings, a preferred embodiment of the invention is illustrated in connection with the discharge or feeding of granular solid particles in a solids-gas contacting system. More particularly, the illustrated embodiment pertains to an iron oxide ore reduction system wherein iron ore particles are contacted with a reducing gas and are thence discharged from the reducing zone into a hearth or melting zone. Thus, the device comprises an external fluid-tight housing 11 which is preferably cylindrical with a circumferential side wall 12, a lower end wall 13, and an upper end closure plate 14 which is detachably secured, as by bolts 16, to a flanged end portion of the circumferential side wall 12. Within the housing 11 a rotary container, indicated generally at 17, is mounted on an inclined axis which in the illustrated embodiment is coaxial with the axis of the housing 11. Preferably, both the housing 11 and the rotary container 17 are generally cylindrical in shape. Thus, the container 17 has a circumferential side wall 18 and a transverse wall 19 which in this instance is a lower end wall of the cylindrical container. In other words, both the side wall 18 and the end wall 19 comprise surfaces of revolution with respect to the axis of the container 17.

The rotary container 17 is supported by means of a spider arrangement comprising a plurality of radially extending, circumferentially spaced arms 21 rigidly secured to the end wall 19 of the rotary cylinder and extending from a drive shaft 22. Water cooled radial and thrust bearings 23 and 24 are provided for rotatably mounting the shaft 22 and are supported in housing structure 26 connected to the end wall 13 of the housing 11. Water or other suitable cooling liquid may be circulated through the bearing structure by means of pipes 27. A sheave or pulley 28 is keyed to the outer end of the shaft 22 and is secured in place by a lock-nut 29 for providing a driving connection with a suitable power source (not shown). Preferably, the power source comprises a motor provided with a variable speed control so as to permit careful regulation of the rotary speed of the container 17.

In this embodiment of the invention, the lower axial end wall 19 of the rotary cylinder 17 has a restricted central opening 31 so as to provide, in effect, an annular baffle ring. Because of the axial inclination of the cylinder 17, it will be seen from FIG. 1 that the angularly related walls 18 and 19 define therebetween a continuous annular trough or pocket 34 having a generally V-shaped cross-section radially of the cylinder 17. A feed pipe or conduit 32 connects with a vessel, shown fragmentarily at 33, which contains a supply of granular solid particles. For example, the vessel 33 may comprise a reduction zone wherein solid iron oxide ore particles are contacted with a reducing gas stream and the reduced particles of iron ore then flow downwardly by gravity through the outlet pipe 32. The pipe 32 extends downwardly in fluid-tight relation through the cover 14 of the housing 11 in generally vertical alignment with the apex of the V-shaped trough or angular space 34. The lower or outlet end of the feed pipe 32 is disposed at or below the level of the lowermost part of the opening 31 in the end wall or baffle ring 19 so that the point of discharge of the confined stream of solid particles into the relatively enlarged angular space or pocket 34 is within the confines of the walls 18 and 19 defining the trough. As will hereinafter appear, this relationship of the feed pipe outlet with respect to the annular pocket or trough is very important for proper operation of the device. If desired, the feed pipe 32 or the vessel 33 may be provided with vibrating means to facilitate downward gravity flow of the solids.

Although the effectiveness of the device in controlling solids flow is dependent upon the inclined relationship of the rotary cylinder 17, the exact degree of inclination is not highly critical. Generally speaking, it is preferred that the axis of the rotating cylinder be at an angle of from about 30° to about 60° with respect to the horizontal. However, for a container of the general configuration illustrated in the drawings wherein the circumferential side wall and the transverse wall defining the V-shaped trough are at right angles to each other, it will be apparent that a 45° inclination for the axis of rotation is the optimum and most convenient relation. In other words, with the rotary cylinder inclined at an angle of 45°, the structure and configuration permits the maximum load or feed rate for a given equipment size.

With the lower or outlet end of the feed pipe 32 dipping below the edges of the angular pocket or trough 34 as discussed above, it will be understood that a "seal" is provided around the outlet end of the feed tube by the solids so as to control the escape of gaseous material to some extent. This is, of course, a highly desirable feature in connection with a solids-gas contacting system. However, the most important reason for having the outlet end of the feed tube 32 disposed at least as low as the level of the lowermost part of the opening from the trough 34 is to insure solids discharge solely in response to rotation of the cylinder 17. In other words, with this relationship, there is little or no possibility of gravity-actuated self-movement of solids in the shortest path directly from the outlet of the pipe 32 to the opening 31. Dependent upon the angle of repose and other inherent characteristics of the solid particles involved, it would be possible in some instances to have the outlet end of the pipe 32 somewhat above the lowest level of the opening 31, but frequently this would provide a condition such that direct "short-circuiting" flow of particles could occur transversely from the outlet of the pipe 32 over the edge of the opening 31 and such flow could occur by gravity alone without dependence upon rotation of the cylinder 17. Consequently, to insure the desired mode of operation regardless of the particle size or the angle of repose or other inherent characteristics of the solid particles being handled, the relationship heretofore described is necessary such that the outlet from the feed pipe 32 is at all times within the confines of the V-shaped trough 34.

It is also necessary that the outlet of the feed pipe 32 be spaced from the walls 18 and 19 defining the trough 34 so that the particles in the confined stream within the pipe 32 can flow by gravity downwardly into the pocket 34. However, once the pocket 34 at the lowermost part of the cylinder 17 is filled with solid particles, further flow of particles can only occur in response to rotation of the cylinder 17. Referring to FIG. 2, wherein the cylinder 17 is shown rotating in the direction indicated by the arrow, it will be seen that the solid particles within the pocket 34 are carried or moved bodily away from the point of discharge of the pipe 32 into the trough 34. As the cylinder 17 rotates, the frictional contact between the solid particles in the trough 34 and the wall 18 and 19 of the cylinder cause the particles to be carried upwardly in an inclined rotary path due to the rotation of the cylinder about its inclined axis. As the solid particles are thus displaced upwardly and inwardly toward the axis of the rotating cylinder, they ultimately spill over the edge of the opening 31 and fall downwardly by gravity between the spaced arms 21 into the interior of the housing 11. A solids draw-off line 36 is connected to the lower part of the housing 11 at the juncture of the side wall 12 and the end wall 13.

Thus, it will be seen that rotation of the inclined cylinder 17 causes the solids filled portion of the trough 34 immediately below the feed pipe 32 to be continuously rotated away from the discharge region of the pipe 32 and a new unfilled or empty trough portion is continuously moved into position under the outlet of the pipe 32 for receiving the confined stream of solids by gravity flow from the pipe 32. As will be evident from FIG. 2, the actual point of overflow of solids through the opening 31 is substantially removed, both circumferentially and upwardly, from the outlet of the pipe 32 and there is no direct overflow in a transverse direction at the point of minimum spacing of the pipe 32 from the opening 31. As heretofore pointed out, undesirable "short circuiting" flow across the shortest path from pipe 32 to outlet 31 is prevented by the location of the outlet end of the pipe 32 at least as low as the level of the lowermost part of the opening 31. When the cylinder 17 is stationary, the trough portion 34 underlying the outlet of the pipe 32 is filled and no further gravity flow from the pipe 32 can take place. It is only in response to rotation of the cylinder 17 that the solid particles are bodily moved away in an inclined rotary path so as to permit overflow through the opening 31 and to bring a new unfilled portion of the continuous trough 34 into position underneath the pipe 32 for receiving the confined stream of solid particles.

A highly advantageous feature of the solids flow control device of the present invention is found in the fact that there is substantially a straight line relationship between the solids flow rate and the rotational speed of the cylinder over a wide range. Obviously, this linear response is highly useful since it affords accurate control of flow rate by a single piece of equipment in a wide variety of operating conditions. Thus, the apparatus lends itself readily to solids handling operations requiring close control at either very low rates or very high rates as well as in the intermediate ranges.

Another significant advantage of the invention is the fact that there is very little wear or abrasion of the equipment itself inasmuch as it is unnecessary for the granular solid particles to flow through a restricted opening between metal parts. On the contrary, the enlarged rotating trough 34 carries the solid particles freely away from the outlet of the discharge pipe 32 and allows them to flow without restriction over the edge of the opening 31. Similarly, there is a minimum of attrition or grinding action on the solid particles themselves and as a result there is no detrimental change in the particle size of the solids being handled.

As heretofore mentioned, the solids discharge rate is controlled by the rotational speed of the cylinder, but it should also be mentioned that the clearance or spacing between the outlet end of the feed pipe and the walls of the rotating cylinder is also important. In the embodiment illustrated in FIGS. 1 and 2, the feed pipe 32 is in fixed relation to the cylinder 17 and as a result the discharge rate of solids is controlled entirely by the rotational speed of the cylinder. In this connection, it is a unique advantage of the present device that its operation is substantially independent of the angle of repose of the particles being handled. In other words, it is unnecessary to make any adjustment in the equipment when handling different particles having different angles of repose. This is in sharp contrast to such feeding devices as the rotary table feeder wherein an adjustment of the clearance between the rotating table and the feed pipe is necessary dependent upon the properties and characteristics of the particles being handled.

As will be evident from the structure as thus far described, the device is simple and inexpensive in its initial cost and also has relatively low maintenance costs. Excellent results have been obtained even with extremely abrasive particles such as granular iron ore solids. Because of the low torque requirements, the operating costs of the device are relatively low as compared with screw feeders or the like. Because of the linear relationship between discharge rate and rotational speed, a given apparatus can accommodate a wide range of particle sizes and types and can be used to good advantage both at high and low solids flow rates.

FIG. 3 illustrates a schematic modification which further explains the principle of the invention. In this instance the solid particles are fed from a pipe 38 into the lower trough portion of an inclined cylinder 39 having a circumferential side wall 41 and a solid bottom wall 42. The outlet end of the pipe 38 extends downwardly below the circumferential edge of the open end of the cylinder. As the cylinder 39 is rotated, the solid particles are carried away from the outlet of the pipe 38 in an inclined rotary path and accumulate inside the rotating cylinder 39 until they eventually overflow the edge of the side wall 41 at the open upper end of the cylinder. This arrangement is usually less desirable than the arrangement shown in FIGS. 1 and 2 wherein the bottom wall of the cylinder is provided with a central discharge opening, but it serves to illustrate the basic broad principle of the invention. Also, in FIG. 3 no external gas-tight housing is shown, and it will be understood that such external housing is required only when the invention is utilized in conjunction with a solids-gas contacting step.

In FIGS. 4 and 5, a further modification of the invention is shown wherein the feed pipe is vertically adjustable so as to regulate the clearance between the outlet end of the feed pipe and the rotating cylinder. Thus, a discharge hopper or vessel 43 contains solid particles which flow by gravity downwardly through a fixed section of feed pipe 44. A movable feed pipe section 46 fits telescopically in sliding relation around the section 44 and has a threaded external portion 47. A worm wheel 48 having internal and external threads is carried in a pair of supports 49 and has its threaded inner periphery engaging the external threads 47 of the movable feed pipe section 46. A horizontally mounted worm screw 51 engages the threaded outer periphery of the worm wheel 48 and is driven by a variable speed reversible motor 52. The lower end of the adjustable feed pipe section 46 extends into the lower trough portion of a rotatable cylinder 53 which is similar in construction to the cylinder 17 of FIGS. 1 and 2.

In this embodiment of the invention, a wide range of solid particle sizes is readily accommodated. For example, if it is desired to feed powdered or fine coal immediately followed by pea or nut size coal, this can be accomplished simply by adjusting the position of the feed pipe section 46. This form of the invention also has the advantage that the solids flow rate is controllable not only by the rotational speed of the cylinder 53 but also by regulation of the clearance between the lower outlet end of the feed pipe section 46 and the walls of the cylinder 53. Thus, to increase the solids flow rate, the rotational speed of the cylinder 53 may be increased or the motor 52 may be operated in a direction to elevate the feed pipe section 46 so as to increase the clearance between the end of the feed pipe and the walls of the rotating cylinder. Likewise, to decrease the solids flow rate, the rotational speed of the cylinder 53 may be decreased or the motor 52 may be operated in the opposite direction to lower the feed pipe section 46 and thereby diminish the clearance between the end of the feed pipe and the rotating cylinder.

Although the invention has been described with particular reference to certain specific structural embodiments thereof, it is to be understood that various modifications and equivalent structures may be resorted to without departing from the scope of the invention as defined in the appended claims.

We claim:

1. A device for the controlled discharge of solid particles comprising an axially inclined rotary container having transverse and side walls angularly related to each other and having one end thereof provided with a coaxial discharge opening, conduit means having an outlet opening for feeding solid particles into the angular space between said walls at the lower part of the container, and means for rotating said container about its inclined axis, the whole of said outlet opening of said conduit means being at least as low as the level of the lowermost part of said discharge opening and spaced from said walls whereby solid particles are continuously carried away from said outlet opening by the rotation of said container and discharged through said discharge opening in a continuous stream.

2. The device of claim 1 further characterized in that said walls are surfaces of revolution about said axis.

3. A device for the controlled discharge of solid particles comprising an axially inclined rotary cylinder having a circumferential wall and a transversely extending wall, said walls defining therebetween an annular trough having a generally V-shaped radial cross-section, said cylinder also having at one end thereof a discharge opening arranged coaxially with respect to the axis of rotation of the cylinder, conduit means extending into said cylinder and having an outlet opening for feeding solid particles into said trough, and means for rotating said cylinder about its inclined axis, the whole of said outlet opening being disposed within the confines of said trough and being at least as low as the lowermost edge of said discharge opening and spaced from said walls whereby solid particles are continuously carried away from said outlet opening by the rotation of said cylinder and discharged over an edge of said trough through said discharge opening in a continuous stream.

4. The device of claim 3 further characterized in that said conduit means comprises a feed pipe having its longitudinal axis extending generally vertically with respect to the apex of said trough.

5. The device of claim 3 further characterized in that the axis of rotation of said cylinder is inclined at an angle of about 45°.

6. A device for the controlled discharge of solid particles comprising an axially inclined rotary cylinder having a circumferential wall and an annular baffle extending transversely across said cylinder, said baffle having a central coaxial discharge opening and said wall and said baffle defining therebetween an annular trough having a generally V-shaped radial cross-section, conduit means extending into said cylinder and having an outlet opening wholly within the confines of said trough, the whole of said outlet opening being at least as low as the lowermost edge of said central opening and spaced from said wall and said baffle for feeding solid particles into said trough, and means for rotating said cylinder about its inclined axis, the solid particles being continuously moved away from said outlet opening and being discharged over the edge of said central opening in a continuous stream in response to rotation of the inclined cylinder.

7. A device for the controlled discharge of solid particles comprising an axially inclined rotary cylinder having a circumferential side wall, an open upper end, and an annular end wall with a central coaxial discharge opening at the lower axial end of the cylinder, said walls defining therebetween an annular trough having a generally V-shaped radial cross-section, a feed pipe extending through said open upper end into the lower part of said cylinder and terminating in an outlet opening wholly within the confines of said trough, the whole of said outlet opening being at least as low as the lowermost edge of said central opening and spaced from said walls for feeding solid particles into said trough, and means for rotating said cylinder about its inclined axis, the solid particles being continuously moved away from said outlet opening and being discharged over the edge of said central opening in a continuous stream in response to rotation of said cylinder.

8. The device of claim 7 further characterized in that said feed pipe extends generally vertically with respect to the apex of said trough.

9. The device of claim 7 further characterized in that said cylinder is supported by spider means comprising a plurality of arms extending from a common drive shaft and rigidly connected in circumferentially spaced relation to said annular end wall for rotating said cylinder and permitting discharge of solid particles from said central opening downwardly between the spaced arms.

10. A device for the controlled discharge of solid particles comprising an axially inclined rotary cylinder having a circumferential side wall, an open upper end, and a closed end wall at the lower axial end of the cylinder, said walls defining therebetween an annular trough having a generally V-shaped radial cross-section, a feed pipe extending through said open upper end into the lower part of said cylinder and terminating in an outlet opening wholly within the confines of said trough, the whole of said outlet opening being at least as low as the lowermost edge of said open upper end and spaced from said walls for feeding solid particles into said trough, and means for rotating said cylinder about its inclined axis, the solid particles being continuously moved away from said outlet opening and being discharged over the edge of said side wall at said open upper end in a continuous stream in response to rotation of said cylinder.

11. The device of claim 3 further characterized in that said conduit means comprises a feed pipe in fixed relation with respect to said cylinder, said pipe terminating in an outlet opening disposed wholly within the confines of said trough and in predetermined spaced relation from said walls.

12. The device of claim 3 further characterized in that said conduit means comprises an adjustable feed pipe having an outlet opening disposed wholly within the confines of said trough and having means for varying the position of said pipe relative to said cylinder for providing a selected spacing between said outlet opening and said walls.

13. In a device for the controlled discharge of solid particles having a fluid-tight external housing and means for withdrawing solid particles from the latter, the improvement comprising an axially inclined cylinder within said housing, shaft means connected to said cylinder, bearing means carried by said housing for supporting said shaft means, means cooperable with said shaft means for rotating said cylinder about its inclined axis, said cylinder having a circumferential wall and a transversely extending wall defining therebetween an annular trough having a generally V-shaped radial cross-section, said cylinder also having at one end thereof a discharge opening arranged coaxially with respect to the axis of rotation of the cylinder, and conduit means extending through said housing in fluid-tight relation therewith and having an outlet opening disposed wholly within the confines of said trough for feeding solid particles into said trough, the whole of said outlet opening being at least as low as the lowermost edge of said discharge opening, the solid particles being continuously moved away from said outlet and being discharged over an edge portion of said trough through said discharge opening in a continuous stream into said housing in response to rotation of said cylinder.

14. A device for the controlled discharge of solid particles comprising an axially inclined generally cylindrical fluid-tight external housing having a cylindrical side wall and upper and lower axial end walls, a discharge outlet extending from the lower part of said housing for withdrawing solid particles, an axially inclined rotary cylinder disposed substantially coaxially within said housing and having a circumferential side wall, an open upper end, and an annular end wall with a central coaxial discharge opening at the lower end of said cylinder, the side wall and the annular end wall of said cylinder defining therebetween an annular trough having a generally V-shaped radial cross-section, bearing means carried by the lower axial end wall of said housing, shaft means extending through the lower axial end wall of said housing in journaled relation with said bearing means, means comprising a plurality of arms extending from said shaft means and connected in circumferentially spaced relation to the annular end wall of said rotary cylinder for supporting and driving the latter, a feed pipe extending in fluid-tight relation through the upper axial end wall of said housing and having an outlet opening at the lower part of the cylinder wholly within the confines of said trough for feeding solid particles into said trough, the whole of said outlet opening being at least as low as the lowermost edge of said central opening, and means for driving said shaft means for rotating the cylinder about its inclined axis whereby to effect continuous movement of the solid particles away from the feed pipe outlet opening for discharge thereof over the edge of said central opening in a continuous stream and thence downwardly between said arms for withdrawal through said discharge outlet.

15. A method for the controlled discharge of solid particles comprising the steps of feeding solid particles downwardly as a substantially vertical confined stream into an enlarged annular pocket defined between a pair of angularly related walls, discharging said confined stream into said pocket wholly at a level on or below the lowermost edge of said walls, and continuously moving said particles bodily away from said confined stream in an inclined rotary path so that said particles overflow from said pocket in a continuous stream.

16. A method for controlling the flow of solids which comprises gravity feeding a substantially vertical confined stream of solids downwardly into an axially inclined annular trough, said trough providing an enlarged pocket for receiving the solids with the discharge point of said stream into said pocket being wholly at a level on or below the lowermost edge of said trough, and rotating said trough to continuously carry said solids bodily away from said discharge point in an inclined rotary path whereby to cause said solids to overflow an edge of said trough in a continuous stream.

References Cited in the file of this patent

UNITED STATES PATENTS

| Re. 9,061 | Cochrane | Feb. 3, 1880 |
| 1,495,178 | Hodgdon | May 27, 1924 |
| 2,544,575 | Weber | Mar. 6, 1951 |
| 2,684,782 | Lime et al. | July 27, 1954 |

FOREIGN PATENTS

| 528,868 | Germany | July 7, 1931 |
| 901,605 | France | Nov. 6, 1944 |